Aug. 23, 1960 J. E. MACK 2,949,843
PORTABLE EMERGENCY FARM PRODUCE AERATOR
Filed Aug. 5, 1958
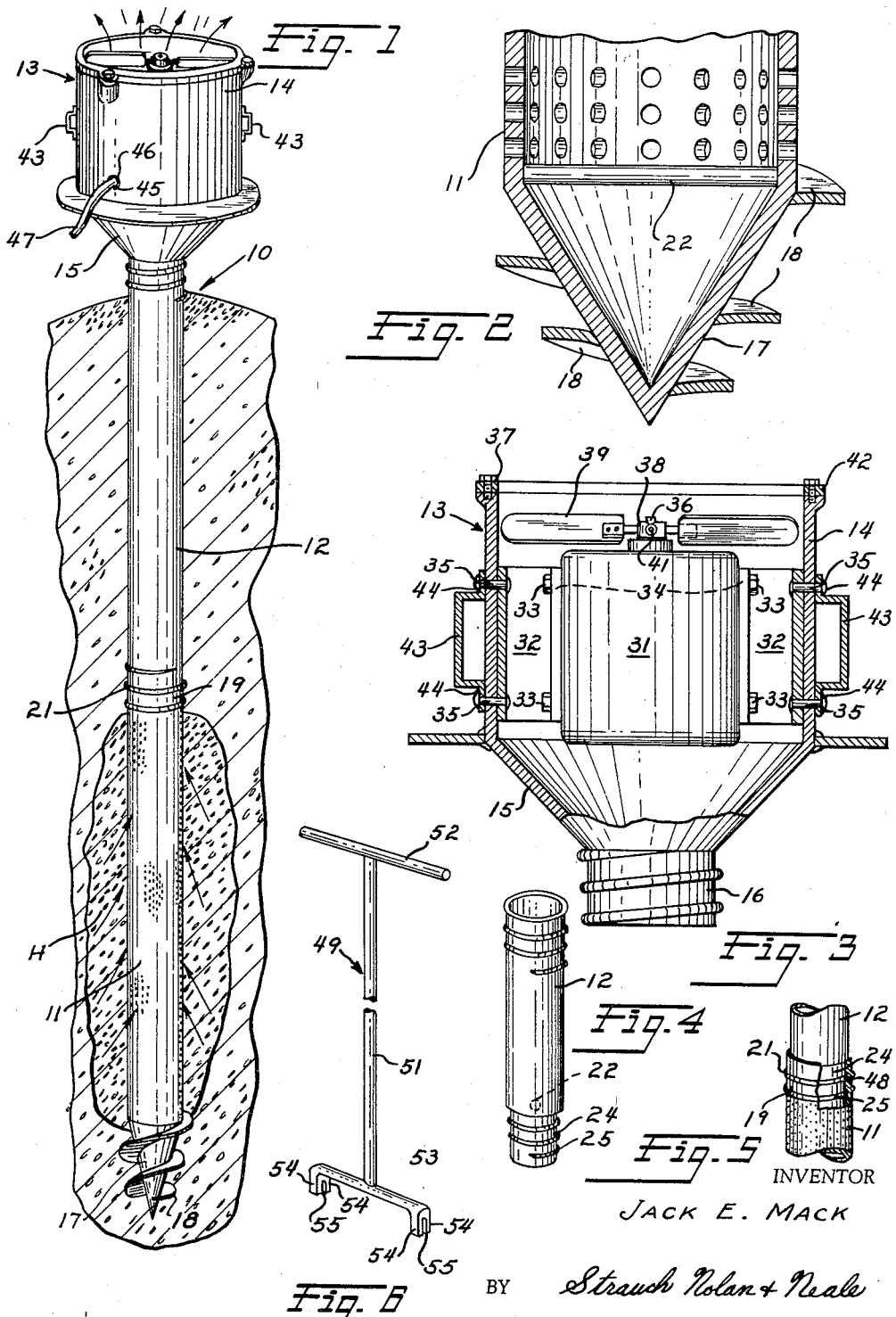
INVENTOR
JACK E. MACK
BY Strauch Nolan & Neale
ATTORNEYS

United States Patent Office 2,949,843
Patented Aug. 23, 1960

2,949,843

PORTABLE EMERGENCY FARM PRODUCE AERATOR

Jack E. Mack, Air-O-Vator Co., Inc., 1405 Avenue B, Scottsbluff, Nebr.

Filed Aug. 5, 1958, Ser. No. 753,221

6 Claims. (Cl. 98—57)

The present invention relates to farm produce aerators and more particularly to a portable aerator adapted to be introduced into a stockpile of farm produce having localized hot moist spots engendering spoilage and insect infestation.

Until recent years the stockpiling of grain, milo and many other farm products in storage buildings, bins and like structures or in the open to await favorable marketing times or until it becomes desirable to make ultimate use of the harvested produce has been a hazardous and expensive operation due to the normal respiration processes (breathing of the live plant life) which results in the exuding of heat and moisture during the drying out of green produce and long storage periods of closely piled produce. In recent years, applicant's company, Air-O-Vator Co. Inc. of Scottsbluff, Nebraska, devised and has marketed a permanently installed aerator which has successfully met the problem of spoilage of stockpiled farm produce, particularly where the produce is initially stored in storage facilities initially equipped with the aforesaid aerator. This aerator, forming the subject matter of the copending application of Eulah Mack, Serial No. 445,685, filed July 26, 1954, now Patent No. 2,856,838, and entitled Farm Produce or Like Aerating Device, when equipped with a so-called "probe" type breather element disclosed in the aforesaid Eulah Mack application has achieved substantial success when incorporated in stockpiled grain wherein spoilage conditions have already started. However, such usage of the Eulah Mack aerator has fallen short of maximum efficiency due to the difficulty of installation and the fact that sufficiently rapid dissipation of the existing spoilage conditions has not always been possible. In an effort to overcome these deficiencies of the Eulah Mack aerator and to more fully overcome the highly expensive and tedious operation of repiling the stockpiled produce by use of auger type conveyors or manually shovelling the grain, applicant has devised the portable aerator of the present invention.

It, accordingly, is the primary object of this invention to provide a portable aerator which may be readily inserted into an existing stockpile of farm produce to eliminate spoilage conditions which arise due to the failure to initially provide an adequate aerator.

A further important object of this invention resides in the provision of a portable aerator made up of an auger-nosed perforated breather element, one or more imperforate stack segments coupled to the auger-nosed breather element to provide a stack section and a motor driven fan means including a fan housing having an inlet end coupled to the final stack segment and an outlet open to the ambient atmosphere surrounding the stockpiled produce.

Another object of the present invention resides in providing a perforated auger-nosed breather element having an internal tool coupling formation adapted for engagement by a rotatable tool provided to rotate the breather element so as to drive the breather element into an existing stockpile of farm produce and an airtight coupling formation at the end remote from the auger-nose.

A further object of the present invention resides in providing an imperforate stack segment having coupling ends adapted for airtight cooperation respectively with the auger-nosed breather element of the preceding object and with a succeeding stack segment or a fan housing inlet to form a breather assembly including an exhaust stack section and also having an internal tool coupling formation adapted for engagement by a rotatable tool provided to rotate the stack segment to first couple it to the breather element and thereafter drive the breather element further into the stockpiled produce and draw the stack section into the stockpiled produce.

Still another object of the invention resides in providing a tool for coupled engagement with the aforesaid breather element or succeeding stack segments and having a shank exceeding the length of the bore of the breather element and the stack segments and terminating in means for rotating the tool to drive the breather element and, thereafter, the breather element and its associated stack section into an existing stockpile of farm produce.

Further objects will appear from the following description when read in conjunction with the appended claims and accompanying drawings wherein:

Figure 1 is a fragmental sectional view through a stockpile of grain, such as wheat, illustrating the portable aerator of this invention in elevation with its breather element located in a so-called "hot spot," its stack section protruding from the stockpile and mounting the circulating motor driven fan means;

Figure 2 is an enlarged fragmental sectional view through the lower end of the breather element and illustrating the external auger thread and a preferred internal tool coupling formation;

Figure 3 is an enlarged sectional view through the motor driven fan means of Figure 1;

Figure 4 is an elevational view on a reduced scale of one of the stack segments employed either alone or in conjunction with other stack segments to form the stack section extending between the breather element and the fan means;

Figure 5 is a fragmental elevational view with a portion cut away and sectioned to illustrate the coupled connection between the breather element and the adjacent stack segment; and Figure 6 is a perspective view of the rotating tool provided for rotating the breather element and its associated stack segments to drive the breather element into the stockpiled grain and to couple the respective stack segments to the breather element and each other and successively drive the breather element and stack section into the stockpiled grain to the desired depth.

With continued reference to the drawings wherein the reference numerals are employed throughout to designate the same elements or parts, the complete portable aerator 10 of this invention is composed of a perforated breather element 11, one or more stack segments 12 and motor driven fan means 13 the housing 14 of which includes a transisition or reducer section 15 terminating in a stack segment coupling end 16.

As clearly appears from Figures 1 and 2 breather element 11 preferably comprises a perforated cylindrical tube member one end of which, namely, the nose or initial entry end 17, is of protuberant conical configuration and is imperforate and carries a laterally outwardly extending auger type thread convolution 18 arranged to drill an opening in the grain or other farm produce stockpile upon bodily rotation of breather element 11. The opposite end of breather element 11 is imperforate throughout a short length and is formed to provide an airtight coupling terminal portion 19. While the airtight coupling terminal portion may take any suitable form, it preferably comprises a connector thread formation 21. In order to adapt breather element 11 for rotation to drive it into the stockpiled grain, the tube member interiorly thereof is provided with a tool coupling formation 22 of suitable form. As illustrated, tool coupling formation 22 comprises a cylindrical cross bar spanning the bore of the tube member along a diameter thereof. It will be appreciated that formation 22 may assume many other forms and may be formed as an integral part of the tube member or as a separate member welded or otherwise fixedly secured to the wall of the tube member. While formation 22 is illustrated as extending crosswise of breather element 11 adjacent its auger-nosed end, it is to be understood that this is the preferred location to assure the most efficient coupling of the rotating tool for starting the penetration of the stockpiled produce and that the tool formation may be formed at any other point along the tube and could, if desired, be placed on the exterior face of the tube wall.

Stock segment 12 as most clearly illustrated in Figures 4 and 5 comprises a suitable length of imperforate tubing having a reduced diameter nose end 24 having a male thread 25 on its outer surface adapted to be coupled to coupler portion 19 of breather element 11. The opposite end of stack segment 12 is made in the form of an airtight coupler portion 19 similar to that of breather element 11 and containing an identical female thread 21. A similar tool coupling formation 22 is also provided in stack segment 12, preferably adjacent its nose end 24, for threading segment 12 tightly into breather element 11 and thereafter rotating element 11 and segment 12 as a unit to drive element 11 further into the stockpiled produce and cause segment 12 to penetrate the opening formed by element 11.

Assuming that the element 11 and segment 12 are each 3 feet long and that it has been determined, by use of a conventional probe type thermometer provided for the purpose, that a "hot spot" H exists in the stockpiled grain about 5 feet in from the upper surface as illustrated in Figure 1, breather element 11 with a single stack segment 12 forming the imperforate stack section will be driven into place as illustrated in Figure 1. However, if the "hot spot" is located at a greater depth one or more stack segments 12 as required will be successively coupled to the first stack segment and the assembled elements will be driven deeper into the stockpile to dispose the breather element 11 in the trouble area with the final stack segment coupler end protruding generally as shown in Figure 1. Accordingly, the stack section will consist of one or more stack segments as required and the coupler end of the final segment 12 will be exposed for receiving the fan means 13 which will now be described in greater detail.

Fan means 13 with its housing 14 of substantially greater diameter than stack segments 12, mounts an electric motor 31 by means of suitable motor mountings such as the U-shaped hanger plates 32 of Figure 3. Any suitable number of hanger plates 32 may be employed and they are preferably secured to the motor housing by suitable hexagon headed machine screws 33 threaded into tapped openings (not shown) in the motor housing with their shanks extending freely through openings 34 provided in the inner arms of the hanger plates. The outer hanger plate arms are in turn fixedly secured to the wall of housing 14 preferably by rivets 35. By this construction the fan motor is removably secured to the housing for ready removal for servicing or replacement if necessary. Since the motor 31 is disposed in the direct flow path of the exhaust air and as chaff and dust are likely to be present in the exhaust air, a factory sealed motor unit is preferably employed.

As clearly appears from Figure 3, the motor shaft 36 extends upwardly toward the exhaust end 37 of housing 14 and directly mounts the hub 38 of a fan blade assembly 39 the blades of which extend substantially the full width of the interior of housing 14. Any suitable means such as set screw 41 may be employed to non-rotatably secure hub 38 to motor shaft 36. Since the exhaust end 37 of housing 14 is closely adjacent the fan blade assembly 39 and is exposed to users and the curious, a guard grating 42 is preferably removably bolted to the exhaust end of the housing 14. The exterior of housing 14 is preferably provided with handles 43 welded thereto as indicated at 44. These handles are employed in handling the fan means 13 and may, if desired, be used to finally drive the aerator further into the stockpiled produce should this be necessary or if it is desired to firmly seat the conical housing portion 15 in the stockpiled produce to secure a firmer support of the aerator as may be desirable when only a single stack segment 12 is employed. To positively limit the entry of the fan housing into the produce pile, an abutment ring 40 is preferably secured to the body of housing 14 immediately adjacent the juncture of conical transition portion 15 by suitable welding as indicated in Figure 3.

Referring for the moment to Figures 1 and 3, it will be appreciated that stack segment coupling end 16 is of a diameter equal to that of the interior of the airtight coupler inner diameters and that the housing of motor 31 is at least of equal diameter. To assure effective operation of the fan means in producing a desired air flow, the diameter of the main body of fan housing 14 should be at least twice that of the stack segments. At a suitable point in the body wall of housing 14, a power cord opening 45 is formed and fitted with a sealing collar 46 adapted to sealingly encompass the electrical power cord 47 (Figure 1) for motor 31.

While a sufficiently tight coupling of the various stack segments 12 to each other and to breather element 11 can be effected by use of the tool of this invention to permit the aerator to be removed under normal circumstances, the mating coupling ends may, if desired, be provided with respective pin openings adapted to be aligned and fitted with a coupling pin 48 (Figure 5) to prevent uncoupling upon reverse rotation, if such rotation should be found desirable to effectively "back out" the tubing through use of the tool 49. As clearly appears from Figure 6, tool 49 comprises a rod-like shank 51 the length of which should be sufficiently greater than that of breather element 11 and the stack segments 12 to permit the cross handle 52 to be freely exposed for convenient grasping by the operator. Shank 51 at the end opposite that containing handle 52 is provided with a cross bar 53 the opposite ends of which are disposed to freely enter breather element 11 and stack segments 12. Each end of cross bar 53 has integrally formed thereon a pair of depending arms or flanges 54 defining between them a downwardly opening socket opening 55. Socket openings 55 are of sufficient width to freely receive cross bars 22 when the tool is entered axially through the breather element 11 or stack segments 12. Upon coupling cross bars 22 in socket openings 55 and pressing downwardly on handle 52 while bodily rotating the tool around the axis of its shank, it will be appreciated that effective entry of the breather element and its associated stack segments into the produce may be effected as well as tight coupling of the threaded connections.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A portable farm produce aerator for emergency use comprising a cylindrical, perforated wall, breather element having at one end an auger-nose adapted upon rotation to draw said breather element into a stock-pile of farm produce and having at its other end an airtight coupling formation; an imperforate stack tube section having one end drivingly coupled to said coupling formation and a free end provided with an airtight coupling formation and disposed in protruding relation from said stockpiled produce and adapted upon rotation of said auger-nose to be drawn along behind said breather element as it penetrates further into said stockpiled produce to position the breather element in a previously located moist hot spot in the stockpiled produce, said stack tube section in the final positioning of said aerator in said stockpiled produce extending from said other end of said breather element to dispose its free end protruding from said stockpiled produce and said breather element and said imperforate tube section having inwardly extending formations adapted to be engaged by a tool for rotating said breather element and said breather element and imperforate tube section to auger said breather element into said stockpiled produce into position in said hot spot; and powered fan means including an enclosing housing having an inlet end drivingly coupled to said other end of said stack tube section to effectively extend the inlet end of said fan means to the perforated breather element and having a discharge opening open to the atmosphere, said powered fan means being adapted to induce a high volume flow of air from said hot spot, into said breather element and through said stack tube section and fan housing and out of said fan discharge opening to the atmosphere thereby exhausting the air and moisture from said hot spot and inducing a flow of cool relatively moisture free ambient air inwardly through said stockpiled produce and said hot spot to condition the produce in and around said hot spot and inhibit spoilage due to hot spots in stockpiled produce.

2. A portable farm produce aerator for emergency use comprising a cylindrical, perforated wall, breather element having at one end an auger-nose adapted upon rotation to draw said breather element into a stock-pile of farm produce and having at its other end an airtight coupling formation; an imperforate stack tube section having one end drivingly coupled to said coupling formation and a free end provided with an airtight coupling formation and disposed in protruding relation from said stockpiled produce and adapted upon rotation of said auger-nose to be drawn along behind said breather element as it penetrates further into said stockpiled produce to position the breather element in a previously located moist hot spot in the stockpiled produce, said stack tube section in the final positioning of said aerator in said stockpiled produce extending from said other end of said breather element to dispose its free end protruding from said stockpiled produce; and powered fan means including an enclosing housing having an inlet end drivingly coupled to said other end of said stack tube section to effectively extend the inlet end of said fan means to the perforated breather element and having a discharge opening open to the atmosphere, said powered fan means being adapted to induce a high volume flow of air from said hot spot, into said breather element and through said stack tube section and fan housing and out of said fan discharge opening to the atmosphere thereby exhausting the air and moisture from said hot spot and inducing a flow of cool relatively moisturefree ambient air inwardly through said stockpiled produce and said hot spot to condition the produce in and around said hot spot and inhibit spoilage due to hot spots in stockpiled produce, said air tight coupling formations comprising respective thread formations, said one end of said imperforate tube section and said inlet end of said fan means being respectively provided with mating thread formations to matingly engage said respective thread formations to couple said imperforate tube section to said breather element and said fan means and said mating thread formations each being provided with respective radially directed pin openings adapted to be aligned in the final assembly and pin means adapted to frictionally engage in said aligned openings to assure unitary reverse rotation of said breather element and imperforate tube section and ready removal of said aerator upon completion of the aeration of said hot spot.

3. A breather element for a portable emergency farm produce aerator comprising a perforated cylindrical tube element having one end in the form of an axially directed, imperforate auger-nose and its other end in the form of an imperforate coupling section having a thread formation therein and a diametrically disposed cross bar extending between and rigidly connected at its opposed ends to the cylindrical wall of said breather element to provide a tool connection adapted to be engaged by a tool for rotating said breather element whereby said breather element may be augered into a stockpile of farm produce.

4. A stack tube section for attachment to the perforated breather element of a farm produce aerator comprising an imperforate cylindrical tube section the opposite ends of which are formed with thread formations adapting said stack tube for removable attachment to said perforated breather element and to a further stack tube section or the housing of a fan means and a diametrically disposed cross bar extending between and rigidly connected at its opposed ends to the cylindrical wall of said stack tube section to provide a tool connection adapted to be engaged by a tool for rotating said tube section whereby said stack tube section may be firmly threadedly engaged with said perforated breather element and thereafter rotated in unison with said perforated breather element to auger said breather element and said stack tube section into stockpiled farm produce sufficiently to dispose said perforated breather element in operative relation to a hot spot located in said stockpiled farm produce at a depth exceeding the length of said breather element.

5. A tool adapted for rotating a perforated cylindrical auger-nosed breather element having inwardly extending tool engaging formations therein and/or an associated imperforate cylindrical stack tube section having inwardly extending tool engaging formations to effect coupling of said element and tube section and augering of said element and/or said element and coupled tube section into stockpiled farm produce comprising a shank portion of a length respectively exceeding that of said element and said tube section; a laterally extending cross element at one end terminating at its opposite ends in socket formations adapted to be selectively coupled with said tool engaging formations; and a laterally extending cross hand grip element at its other end adapted to be gripped by a user of the tool whereby upon coupling of said socket formations with said breather element tool engaging formations and rotation of said tool around the longitudinal axis of its shank said auger-nosed breather element may first be augered into said stockpiled produce and thereafter said stack tube section may be coupled to said breather element and said tool sockets may be coupled with said tool engaging formations of said stack tube section and upon again rotating said tool around said shank axis said breather element may be augered further into said stockpiled produce drawing said stack tube section along behind it.

6. A portable farm produce aerator for emergency use comprising a cylindrical, perforated wall, breather tube having one end in the form of an auger-nose adapted upon rotation of said breather tube to enter said tube into a stockpile of farm produce and having at its other end an airtight coupling formation; an imperforate stack tube section having one end adapted to be drivingly coupled to said breather tube coupling formation, said breather tube and each segment of said stack tube section respectively being provided with a diametrically arranged crossbar spanning the interior tube bores and providing a tool connection for receiving a tool capable of rotating said breather tube to initially drive it into said stockpiled produce and rotating each stack tube segment to first couple said segments to said breather tube or a preceding stack tube segment and thereafter drive said breather tube and each successive stack tube segment into said stockpiled produce to enable said breather tube to be positioned at the desired depth in said stockpiled produce; and powered fan means including an enclosing housing having an inlet end adapted to be drivingly coupled to said other end of said stack tube section to effectively extend the inlet end of said fan means to said breather tube and having its other end open to the atmosphere, said powered fan means, upon rotation of said breather tube and stack tube section into stockpiled farm produce to position said breather tube in a previously located moist hot spot, being adapted to induce a high volume flow of air from said hot spot, into said breather element and through said stack tube section and fan housing and out of said other fan housing end to the atmosphere thereby exhausting the air and moisture from said hot spot and inducing a flow of cool relatively moisture-free ambient air inwardly through said stockpiled produce and said hot spot to condition the produce in and around said hot spot and inhibit spoilage due to hot spots in said stockpiled produce.

References Cited in the file of this patent

UNITED STATES PATENTS

| | | |
|---|---|---|
| 1,781,608 | Stroble | Nov. 11, 1930 |
| 2,466,362 | Blake | Apr. 5, 1949 |

FOREIGN PATENTS

| | | |
|---|---|---|
| 2,029 | Great Britain | Aug. 7, 1866 |
| 79,751 | Switzerland | Dec. 16, 1918 |
| 614,965 | France | Apr. 22, 1926 |
| 586,324 | Great Britain | Mar. 14, 1947 |
| 1,015,635 | Germany | Sept. 12, 1957 |